(12) United States Patent
Mayer et al.

(10) Patent No.: US 8,589,310 B2
(45) Date of Patent: Nov. 19, 2013

(54) METHOD FOR DELIVERING AND RETRIEVING RETURN DELIVERIES TO AND FROM AN ELECTRONIC PARCEL DEPOSIT BOX FACILITY

(75) Inventors: Boris Mayer, Bonn (DE); Thomas Ogilvie, Bonn (DE)

(73) Assignee: Deutsche Post AG, Bonn (DE)

( * ) Notice: Subject to any disclaimer, the term of this patent is extended or adjusted under 35 U.S.C. 154(b) by 1302 days.

(21) Appl. No.: 11/628,817

(22) PCT Filed: Apr. 4, 2005

(86) PCT No.: PCT/EP2005/003539
§ 371 (c)(1),
(2), (4) Date: Feb. 2, 2007

(87) PCT Pub. No.: WO2005/122101
PCT Pub. Date: Dec. 22, 2005

(65) Prior Publication Data
US 2007/0296579 A1 Dec. 27, 2007

(30) Foreign Application Priority Data
Jun. 7, 2004 (DE) .......................... 10 2004 027 721

(51) Int. Cl.
*G06Q 30/00* (2012.01)
*G06Q 10/00* (2012.01)
*G06F 21/00* (2013.01)

(52) U.S. Cl.
USPC .............................. 705/330; 705/1.1; 705/50

(58) Field of Classification Search
USPC ............ 705/1.1, 5, 7.11–7.42, 330–336, 348, 705/400–418
See application file for complete search history.

(56) References Cited

U.S. PATENT DOCUMENTS

| 5,831,220 A * | 11/1998 | Ramsden et al. ................. 177/1 |
| 6,882,269 B2 * | 4/2005 | Moreno ........................ 340/5.73 |
| 7,293,203 B1 * | 11/2007 | Coatney et al. ................. 714/42 |
| 2002/0178076 A1 * | 11/2002 | Ross .............................. 705/26 |
| 2003/0231112 A1 | 12/2003 | Raju |
| 2004/0084526 A1 * | 5/2004 | Knowles et al. .............. 235/385 |
| 2004/0210493 A1 * | 10/2004 | Sherman et al. ................ 705/28 |

FOREIGN PATENT DOCUMENTS

| DE | 10000830 | 7/2001 |
| DE | 10238342 | 3/2004 |
| DE | 10246650 | 4/2004 |
| WO | WO 01/31593 | 5/2001 |

(Continued)

*Primary Examiner* — George Chen
(74) *Attorney, Agent, or Firm* — Marshall, Gerstein & Borun LLP

(57) ABSTRACT

A method for accepting return deliveries in an electronic parcel deposit box facility, which integrates various logistics service providers and/or customers and various user authorizations, while safeguarding the operator of the parcel deposit box facility against the abuse of the return delivery process. To verify the customer authorizations, the method for operating a parcel deposit box facility comprising several lockable deposit boxes compares recorded customer data with a stored customer profile. Operating functions for the deposit of return deliveries are only released for the customer if the verification is positive. Before a mail item can be deposited, the validity of the mailing information that is contained on the return delivery is also verified. Valid mailing information is assigned to a logistics service provider and is stored, whereas if the mailing information is invalid, no deposit box is released for the deposit. When the return delivery is collected by a postman, the mailing information is recorded again and compared with the stored data. If the details do not match, the mail item is returned to the customer.

9 Claims, 1 Drawing Sheet

(56) References Cited

FOREIGN PATENT DOCUMENTS

| WO | WO 01/52199 | 7/2001 |
| WO | WO 01/75822 | 10/2001 |
| WO | WO 03/032789 | 4/2003 |
| WO | WO 03/040979 | 5/2003 |
| WO | WO 03/056490 | 7/2003 |

* cited by examiner

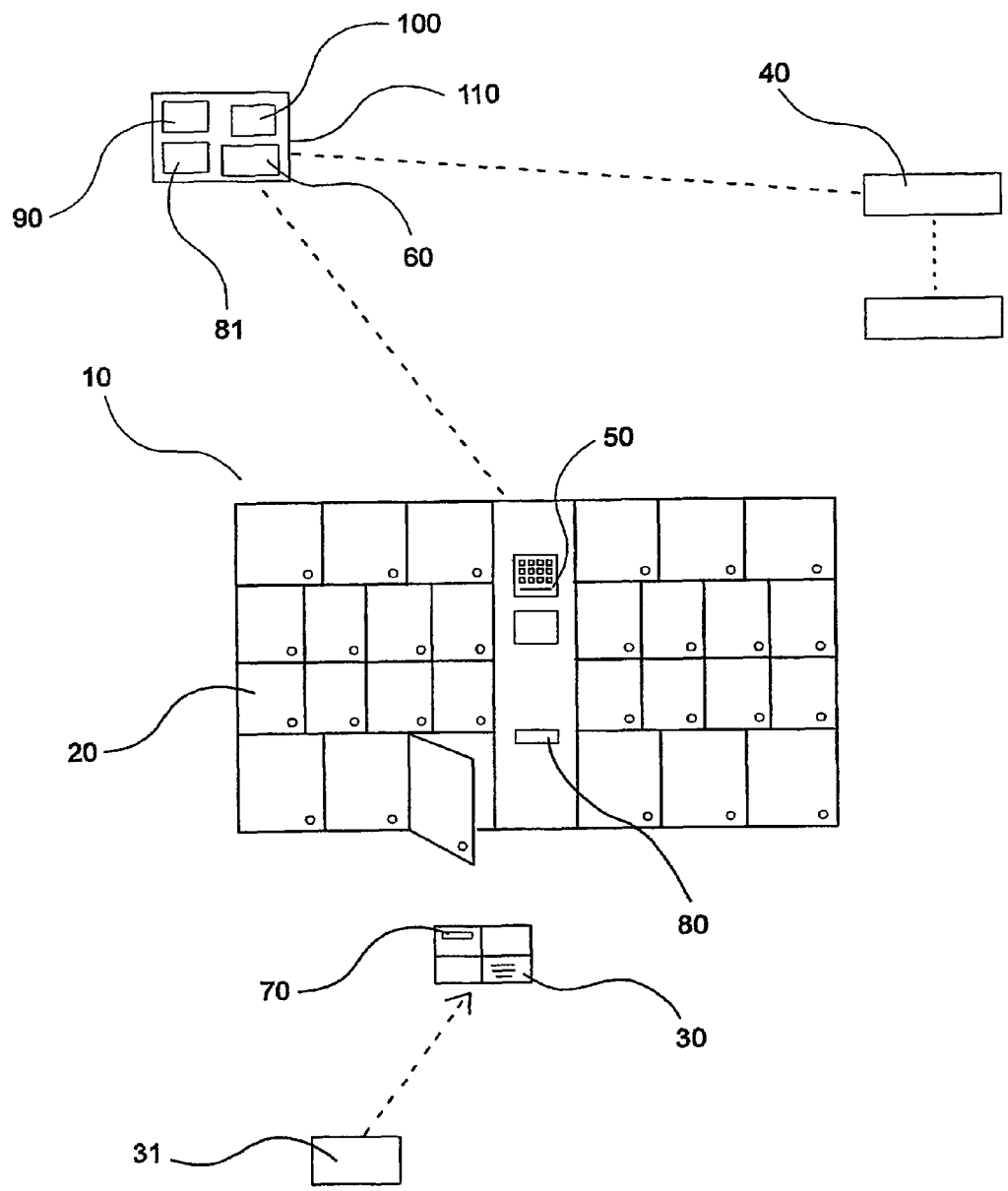

METHOD FOR DELIVERING AND RETRIEVING RETURN DELIVERIES TO AND FROM AN ELECTRONIC PARCEL DEPOSIT BOX FACILITY

BACKGROUND OF THE INVENTION

1. Field of the Invention

The invention relates to a method for operating an electronic parcel deposit box facility having several lockable compartments, whereby at least one logistics service provider is authorized to deposit shipments into or to remove shipments from a parcel deposit box facility, the method comprising accepting a return shipment from a customer (original recipient) so that it can be forwarded to a logistics service provider.

2. Related Technology

In addition to the use of locker compartment systems for storing, for example, luggage or bank documents, the use of systems specifically configured for delivering and picking up goods or mailpieces is known. Such electronic parcel deposit box facilities make it possible for a deliverer to deposit shipments into a lockable compartment of the system, after which the recipient of the shipment is normally informed about the delivery. The recipient can then pick up the shipment from the system at any desired point in time, for which purpose, an individual access code, for example, is transmitted to him/her.

Electronic parcel deposit box facilities and associated methods have the advantage that, for the shipment to be delivered, the customer does not have to be present at his/her home address as is normally the case, but rather the shipment can be deposited in a parcel deposit box facility right away or else after an unsuccessful delivery attempt. Consequently, in case of an unsuccessful delivery attempt, there is no need to leave a notification for the recipient indicating that he has to pick up the shipment during the opening hours of a post office branch but rather the parcel deposit box facility affords him an extra measure of flexibility owing to the parcel deposit box facility.

When shipments are delivered, it is possible that the original recipient might want the shipment to be readdressed so as to be sent back to a seller or logistics service provider. This is the case, for example, with deliveries that are incorrect, damaged or otherwise unsatisfactory. Also in the case of such return shipments, it is advantageous for customers if they can deposit the returns into a parcel deposit box facility at any time of day for pick-up, instead of having to drop them off at a branch of the post office.

A method for depositing goods that an addressee wishes to return to a deliverer is known from DE 100 00 830 C2. The method provides for identifying the addressee at the parcel deposit box facility, after which he can deposit the shipment in a compartment of the system. The addressee also enters the address data of a deliverer who is authorized to have access. The deliverer subsequently identifies himself at the system and removes the shipment.

GENERAL DESCRIPTION OF THE INVENTION

The invention provides a method for depositing return shipments into and picking up return shipments from an electronic parcel deposit box facility that makes it possible to integrate various logistics service providers and/or customers with various utilization rights, whereby the safeguards against fraudulent use during the handling of return shipments should be improved.

The method according to the invention for operating an electronic parcel deposit box facility having several lockable compartments whereby at least one logistics service provider and one customer are authorized to deposit shipments into or to remove shipments from said parcel deposit box facility comprises depositing and picking up a return shipment from a customer (original recipient) so that it can be forwarded to a logistics service provider. The method calls for acquiring customer data of a customer at a first acquisition means of the parcel deposit box facility. Then the access rights of the customer are verified in a verification means belonging to the parcel deposit box facility, by associating the acquired customer data with a stored customer profile.

The procedure at the parcel deposit box facility is terminated if the verification means yields a negative result of the verification. If the verification means yields a positive result of the verification, then access is granted to operating functions at the parcel deposit box facility. Here, a distinction can be made between general operating functions of the parcel deposit box facility and special operating functions for handling return shipments. For example, all of the functions except for the return function can be displayed and made available to the customer if the verification of the customer data has shown that the customer in question does not have return rights.

The method also provides for a second acquisition means to acquire shipment information pertaining to a return shipment. The shipment information is preferably present in the form of a label or sticker on the return shipment. The validity of the acquired shipment information is verified in a verification means belonging to the parcel deposit box facility by comparing the acquired shipment information to stored data. Moreover, the shipment information is associated with a logistics service provider.

If the comparison of the acquired shipment information with stored data yields a negative result, the procedure is terminated, whereas if the comparison of the acquired shipment information with stored data yields a positive result, a compartment of the parcel deposit box facility is opened so that the return shipment can be deposited and the acquired shipment information is stored in a storage means. After a return shipment has been deposited, the compartment is closed and a notification indicating that a return shipment has been deposited is transmitted by means of a notification component belonging to the parcel deposit box facility to the logistics service provider with which the acquired shipment information was associated.

Preferably, a deposited return shipment is displayed at the parcel deposit box facility when the logistics service provider logs in. During or after the removal of a return shipment from a compartment of the parcel deposit box facility by a deliverer, the shipment information is once again acquired by the second acquisition means and compared by a verification means to the shipment information stored in the storage means, after which the procedure is continued if the data matches, whereas it is terminated if the data does not match, and the deliverer is offered an operating function by means of which the return shipment can be readdressed to the customer. This operating function preferably comprises entering the reasons for readdressing the return shipment to the customer. In an especially preferred embodiment of the invention, the notification component then notifies the customer that a return shipment has been readdressed to him.

In an especially preferred embodiment of the invention, the shipment information is a multi-digit numerical code. The validity of the shipment information can be verified on the basis of the number of digits and/or on the basis of a checksum logic stored in the verification means. Preferably, a fixed set of numbers is associated with each logistics service provider so that, on the basis of the acquired shipment information, the appertaining logistics service provider can be associated with a return.

It has proven to be advantageous for the notification component to transmit a notification to the logistics service provider comprising information about several return shipments that have been deposited for him. These notifications can be issued, for example, at fixed intervals such as days or weeks so that the logistics service provider receives a message indicating how many shipments and what type of shipments have to be removed at the time of the next login into a given parcel deposit box facility.

It is also advantageous for the customer data to be read in from a customer card in the first acquisition means. The data can also be entered by the customer via an acquisition means. The second acquisition means is preferably configured in such a way that it scans in the shipment information.

The method according to the invention has several advantages. For one thing, it allows the verification of customer profiles before a return shipment is deposited, which further safeguards the operator of the parcel deposit box facility against fraudulent use. If a customer is not authorized to deposit return shipments, then this particular operating function is not offered to him.

Secondly, the security of the handling of returns is enhanced in that the shipment information is acquired and evaluated at the time of the deposit by the customer as well as at the time of the pick-up by the deliverer of a logistics service provider. Hence, a customer may only deposit shipments that are provided with a permissible shipment code of a logistics service provider. The shipment code is once again acquired at the time of the pick-up so as to prevent a customer from previously causing an incorrect shipment code to be acquired. Since the data is once again compared, cases of fraudulent use are avoided where, at the time of the deposit, a customer causes shipment information to be acquired that is not present on the deposited shipment.

Through the association of shipment information with specific logistics service providers, it becomes possible to allow several deliverers to be involved in the operation of a parcel deposit box facility without compromising the security of the operator against fraudulent use of the system. It is also possible to integrate several customers with different access rights.

Additional advantages, special features and practical embodiments of the invention ensue from the subordinate claims and from the presentation below of a preferred embodiment making reference to FIG. 1.

BRIEF DESCRIPTION OF THE DRAWING

FIG. 1 is a schematic description of an electronic parcel deposit box facility with associated components and uses.

DETAILED DESCRIPTION

FIG. 1 shows a schematic depiction of an electronic parcel deposit box facility 10 with its associated components and users. The parcel deposit box facility can especially be used by several customers 31 and by one or more logistics service providers 40. In the method shown, the customer is the original recipient of a shipment 30 that he would like to return to the sender via a logistics service provider. This can be the case, for example, with deliveries that are incorrect, damaged or otherwise unsatisfactory, exchanges or simply cases in which the recipient did not like the item. The customer/recipient might originally have received the shipment by having picked it up at a parcel deposit box facility or through a regular delivery at his home address. In this context, such a shipment is referred to as a return shipment.

In order for the customer 31 to access the operating functions at the parcel deposit box facility, he normally has to identify himself at operating means of the system. This can be done by entering a PIN code or some other access code. In an especially preferred embodiment, the entry of access data can be augmented or replaced by inserting a customer card.

The customer data is acquired in a first acquisition means 50 which, depending on the type of data acquisition, can be, for instance, a card reader, a keyboard and/or a touchscreen and/or a scanner. The acquired customer data is associated with a customer profile and the associated access rights of the customer are verified in a verification means 60 belonging to the parcel deposit box facility. The verification means 60 can be located within the parcel deposit box facility or can be connected to the system, for example, online. The online connection can be permanent or it can exist only while procedures are being carried out at the parcel deposit box facility.

In the embodiment shown in FIG. 1, the verification means 60 is located in a central management unit 110 that preferably manages information for several parcel deposit box facilities. The information is advantageously stored and managed in a database 90. In addition to customer profiles, the managed information can also include data relating to logistics service providers and status data about the parcel deposit box facilities.

In an especially preferred embodiment, the central data processing unit 110 also has a notification component 100 that serves to transmit messages between the parcel deposit box facility, the central data processing unit, customers and/or logistics service providers. The notification component sends customers and logistics service providers, for example, automated messages via SMS or e-mail about deposited shipments.

If the verification of a customer profile indicates that the customer is authorized to have access and is permitted to used functions for the acceptance of returns, then the applicable operating functions are offered to him. This is done, for example, via instructions on the display means such as a monitor. If the verification ascertains that the customer is not authorized to have access or is not permitted to use the return function, then the procedure is terminated and preferably a message is displayed to the customer. As an alternative, the functions to which the customer has access can be displayed without an explanatory message.

According to the invention, in order to deposit a return shipment 30, the appertaining shipment information 70 has to be acquired first. This information is present in the form of an imprint, a sticker or a transponder (RFID) on the return shipment. The shipment information can be generated, for example, by a numeric string or a barcode. The acquisition is carried out by means of a second acquisition means 80 which can be, for instance, a scanner. If the shipment information is formed by a numeric string, this numeric string can also be entered by the customer using an input means such as a keyboard or a touchscreen.

The validity of the acquired shipment information is verified by a comparison with the stored information. The data and also the appertaining verification means 60 can be arranged within the parcel deposit box facility or in the central data processing unit. The verification can be carried out, for example, on the basis of the number of digits and/or on the basis of a checksum logic. If the verification shows that the shipment information is invalid, the procedure is terminated and a message to this effect is displayed to the customer. Invalid shipment information is present, for example, if incorrect data formats were acquired, which is an indication of an attempted fraudulent use of the return function. Moreover, if a logistics service provider withdraws from the parcel deposit box facility, this could be a case of obsolete shipment information that no longer allows returns of the original shipment.

If the verification indicates that the acquired shipment information is valid and can be associated with a logistics service provider, then a compartment 20 is released for depositing the return shipment and it is closed after the shipment has been deposited there. A compartment can be selected, for example, as a function of the size of the shipment. If the payment of an additional sum is required in order to deposit the returns, then payment verification can be carried out before a compartment is opened. This is possible, for example, by reading in payment information such as stamps or value coupons on the shipment. Payment functions such as coin slots, reading means for cash cards, credit cards, Eurocheck cards or reading means via cell phones can be provided in order to transact the required payments.

The acquired shipment information is stored in a storage means 81. The storage means can likewise be located within the parcel deposit box facility or in the area of the central data processing unit 110. If the storage means is in the central data processing unit, as shown in FIG. 1, the shipment information is associated with the parcel deposit box facility in question. Moreover, the information is associated with a logistics service provider. This is necessary for notifying the logistics service provider and/or for displaying a return when a deliverer of the logistics service provider logs in.

In an especially preferred embodiment of the invention, a message is transmitted by the notification component 100 to a logistics service provider 40 indicating that a customer has deposited a return shipment for him to pick up. In addition to information about the shipment and about the customer, this message can also contain information about the time of the deposit and/or about the size of the shipment. Preferably, several messages about deposited returns are bundled in a collective message. This can be done, for example, at fixed intervals such as days or weeks.

In another embodiment of the invention, the logistics service provider 40 does not receive a message about deposited returns but rather, when a deliverer logs in at the parcel deposit box facility, a display tells him whether there are any return shipments for him in compartments of the system. These two embodiments can also be combined so that, in addition to a previously sent message, a display is also shown to the logistics service provider at the parcel deposit box facility.

In order to remove a return shipment from a compartment, a deliverer normally has to identify himself at the parcel deposit box facility. During or after the removal of a return shipment, the shipment information present on the shipment is preferably acquired once again and compared to the information stored in the storage means 81. If the shipment code format is not valid or if the acquired shipment information does not match shipment information stored for the parcel deposit box facility in question, this means that, at the time when the shipment was deposited, a customer caused shipment information to be acquired that was not on the shipment in question. In order to prevent such fraudulent use, the procedure is terminated and an operating function is displayed to the deliverer that allows him to readdress the shipment to the customer. Preferably, he is offered the possibility to select the reason for readdressing the shipment or to enter this himself.

In case of a negative comparison of the shipment information, the deliverer places the shipment back into the compartment and the customer 31 is preferably notified by the notification component 100 that he should remove the shipment. The customer can also receive a direct notification (e.g. via e-mail or SMS) from the logistics service provider. It has proven to be advantageous to provide functions by means of which a customer may not deposit any more shipments into the parcel deposit box facility or remove any shipments from it as long as he has not removed a shipment that has been readdressed to him. Moreover, readdressing the shipment can have the consequence that the customer profile in the data processing unit 110 is changed to indicate that the right of this customer to deposit return shipments has been withdrawn.

LIST OF REFERENCE NUMERALS

10 parcel deposit box facility
20 compartment
30 return shipment
31 customer/original recipient
40 logistics service provider
50 first acquisition means
60 verification means
70 shipment information
80 second acquisition means
81 storage means
90 database
100 notification component
110 central data processing unit

The invention claimed is:

1. A method for operating an electronic parcel deposit box facility comprising several lockable compartments, a first acquisition means, a verification means within a central data processing unit, a storage means, and a display, wherein at least one logistics service provider and one customer are authorized to deposit shipments into and/or to remove shipments from a parcel deposit box facility, the method comprising depositing and picking up a return shipment from a customer (original recipient) so that the return shipment can be forwarded to a logistics service provider, the method including the following steps:

acquiring data about a customer via the first acquisition means;

verifying the access rights of the customer to use return functions at the parcel deposit box facility, by the central data processing unit, by associating the acquired customer data with a stored customer profile via the verification means;

terminating, by the central data processing unit, this access verification procedure of the customer if the result of the verification is negative, if the customer does not have access rights to use return functions at the parcel deposit box facility;

granting access, by the central data processing unit, to operating functions at the parcel deposit box facility for depositing return shipments if the result of the verification is positive;

acquiring shipment information pertaining to a return shipment via a second acquisition means;

verifying, by the central data processing unit, the validity of the acquired shipment information by comparing the acquired shipment information to stored data;

associating, by the central data processing unit, the shipment information with a logistics service provider;

verifying, by the central data processing unit, the validity of the shipment information on the basis of the number of digits and/or on the basis of a checksum logic;

terminating, by the central data processing unit, the procedure if the comparison of the acquired shipment information with stored data yields a negative result;

releasing, by the central data processing unit, a compartment of the parcel deposit box facility so that the return shipment can be deposited if the comparison of the acquired shipment information with stored data yields a positive result, and storing the acquired shipment information;

closing the compartment after a return shipment has been deposited;

transmitting, by the central data processing unit, a notification to the logistics service provider, with which the acquired shipment information was associated, indicating that a return shipment has been deposited, the notification being transmitted by a notification component;

determining, by the central data processing unit, when a deliverer logs in at the parcel deposit box facility and in response to the determining, displaying the deposited return shipment to the deliverer at the parcel deposit box facility;

acquiring, by the central data processing unit, the shipment information during or after the removal of a return shipment from a compartment of the parcel deposit box facility via the second acquisition means, and comparing the shipment information with the stored acquired shipment information, whereby the method is continued if the data matches, whereas the method is terminated if the data does not match;

offering a deliverer an operating function by which the return shipment is readdressed to the customer; and changing, by the central data processing unit, the customer profile to indicate that the right of this customer to deposit return shipments has been withdrawn.

2. The method according to claim 1, wherein the shipment information is a multi-digit numerical code.

3. The method according to claim 1, comprising associating a fixed set of numbers with each logistics service provider.

4. The method according to claim 1, wherein the notification component transmits a notification to the logistics service provider comprising information about several return shipments that have been deposited for the logistics service provider.

5. The method according to claim 1, wherein the notification component transmits a notification to the customer indicating that a return shipment has been readdressed to the customer.

6. The method of according to claim 1, wherein the step of acquiring data about a customer comprises using one of a card reader, a keyboard, a touch screen, and a scanner.

7. The method according to claim 1, wherein the step of verifying the access rights of a customer occurs in the parcel deposit box facility.

8. The method according to claim 1, wherein the step of acquiring shipment information comprises using a scanner.

9. The method according to claim 1, wherein the step of storing the acquired shipment information comprises storing the acquired shipment information in the parcel deposit box facility.

* * * * *